(12) United States Patent
Chen et al.

(10) Patent No.: US 9,706,112 B2
(45) Date of Patent: Jul. 11, 2017

(54) IMAGE TUNING IN PHOTOGRAPHIC SYSTEM

(71) Applicant: MediaTek Inc., Hsin-Chu (TW)

(72) Inventors: Yu-Sheng Chen, New Taipei (TW); Mu-Hsing Wu, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/843,132

(22) Filed: Sep. 2, 2015

(65) Prior Publication Data
US 2017/0064198 A1    Mar. 2, 2017

(51) Int. Cl.
H04N 5/232    (2006.01)
G06F 17/30    (2006.01)
G06K 9/00    (2006.01)
G06K 9/66    (2006.01)

(52) U.S. Cl.
CPC ... *H04N 5/23222* (2013.01); *G06F 17/30247* (2013.01); *G06F 17/30522* (2013.01); *G06K 9/00664* (2013.01); *G06K 9/66* (2013.01); *H04N 5/23229* (2013.01); *H04N 5/23293* (2013.01)

(58) Field of Classification Search
CPC .......... H04N 5/23222; H04N 5/23229; H04N 5/23293; G06K 9/00664; G06K 9/66; G06F 17/30244–17/3028
See application file for complete search history.

(56) References Cited

U.S. PATENT DOCUMENTS

| | | | |
|---|---|---|---|
| 5,300,974 A | 4/1994 | Stephenson, III | |
| 6,888,642 B1 | 5/2005 | Isoguchi et al. | |
| 7,082,227 B1 | 7/2006 | Baum et al. | |
| 7,707,132 B2 | 4/2010 | Xie et al. | |
| 7,835,575 B2 | 11/2010 | Kim et al. | |
| 7,870,140 B2 | 1/2011 | Weltman et al. | |
| 8,908,987 B1* | 12/2014 | Krishnaswamy | G06T 5/00 382/260 |
| 2003/0063779 A1 | 4/2003 | Wrigley | |
| 2004/0165769 A1 | 8/2004 | Huh et al. | |
| 2008/0068658 A1* | 3/2008 | Chen | H04N 1/00278 358/1.18 |
| 2008/0216002 A1 | 9/2008 | Morita | |
| 2008/0317376 A1* | 12/2008 | Kasperkiewicz | G06T 5/00 382/274 |

(Continued)

FOREIGN PATENT DOCUMENTS

| | | |
|---|---|---|
| CN | 103679499 | 3/2014 |
| EP | 1 441 308 | 7/2004 |

(Continued)

*Primary Examiner* — Dennis Hogue
(74) *Attorney, Agent, or Firm* — McClure, Qualey & Rodack, LLP (57) ABSTRACT

A photographic system and an associated image tuning method are provided. The image tuning method includes the steps of: capturing an image by an image sensor of the photographic system; analyzing an image content of the captured image to obtain a plurality of candidate images using a preference search strategy; providing the plurality of candidate images for selection by a user of the photographic system; determining an output image based on one of the candidate images selected by the user; and adjusting the preference search strategy by using the user's selection.

26 Claims, 4 Drawing Sheets

(56) References Cited

U.S. PATENT DOCUMENTS

| | | | |
|---|---|---|---|
| 2009/0169073 A1* | 7/2009 | Areste | G06F 19/321 382/128 |
| 2010/0086182 A1* | 4/2010 | Luo | G06T 5/00 382/128 |
| 2011/0242128 A1* | 10/2011 | Kang | G06F 3/011 345/594 |
| 2014/0279895 A1* | 9/2014 | Mehra | G06F 11/1084 707/634 |

FOREIGN PATENT DOCUMENTS

| | | |
|---|---|---|
| EP | 1 815 422 | 6/2012 |
| WO | WO 2006/025209 | 3/2006 |

\* cited by examiner

IMAGE TUNING IN PHOTOGRAPHIC SYSTEM

BACKGROUND OF THE INVENTION

Field of the Invention

The invention relates to image processing, and, in particular, to a photographic system and an associated image tuning method capable of using a preference search strategy to tune a captured image.

Description of the Related Art

With recent advancements made in technology, digital cameras have become widely used nowadays. For most camera-related products on the market, image-tuning preferences are usually used to fine-tune the image being captured. However, image-tuning preferences of the camera-related products on the market are commonly configured for a single phone version. In other words, the image-tuning preferences cannot be customized by different users to fit individual preferences. Therefore, every end user can only get suggestions of candidate images having fixed patterns. Accordingly, there is demand for a photographic system and an associated image tuning method to solve the aforementioned problem.

BRIEF SUMMARY OF THE INVENTION

A detailed description is given in the following embodiments with reference to the accompanying drawings.

In an exemplary embodiment, an image tuning method for use in a photographic system is provided. The image tuning method includes the steps of: capturing an image by an image sensor of the photographic system; analyzing an image content of the captured image to obtain a plurality of candidate images using a preference search strategy; providing the plurality of candidate images for selection by a user of the photographic system; determining an output image based on one of the candidate images selected by the user; and adjusting the preference search strategy by using the user's selection.

In another exemplary embodiment, a photographic system is provided. The photographic system includes: an image sensor, for capturing an image; and a processing unit, configured to analyze image content of the captured image to obtain a plurality of candidate images using a preference search strategy, provide the plurality of candidate images for selection by a user of the photographic system, determine an output image based on one of the candidate images selected by the user, and adjust the preference search strategy by using the user's selection.

In the embodiments, individual preferences for different objects/targets of end users are considered in tuning process. More specifically, a plurality of candidate images obtained by the preference search strategy can be provided for selection by a user of the photographic system and the selected candidate image may be stored non-temporarily (e.g., in an album). Therefore, the tuning process can be closer to different end users to meet their diverse requirements and preferences. In addition, the end users' preferences can be learned from time to time and therefore the tuning process can satisfy time-variant preferences of end users.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
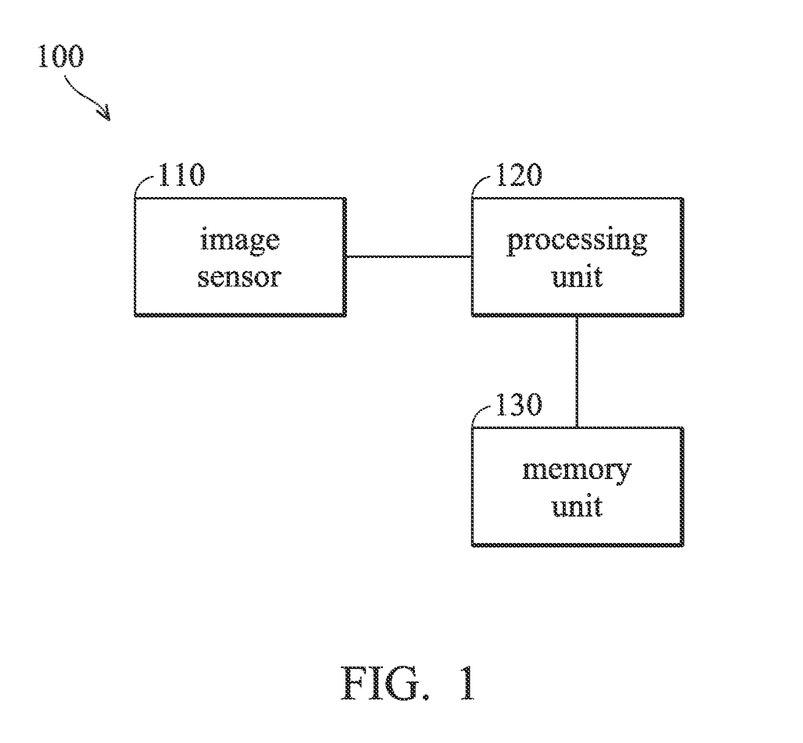
FIG. 1 is a diagram of a photographic system in accordance with an embodiment of the invention.

FIG. 1 is a diagram of a photographic system in accordance with an embodiment of the invention. The photographic system 100 can be a mobile device (e.g., a tablet computer, a smart phone, or a wearable computing device) or a laptop computer capable of acquiring images. The photographic system 100 can comprise an image sensor 110, a processing unit 120. The image sensor 110 is configured to capture an image. The processing unit 120 may perform image processing on raw data of pixels in the captured image from the image sensor 110. The photographic system 100 can further comprise the memory unit 130, which may temporarily store the raw data of pixels in the captured image from the image sensor 110 and provide the raw data to the processing unit 120 for subsequent image processing, where the details will be described later. For example, the memory unit 130 may be a dynamic random access memory (DRAM) or a static random access memory (SRAM). The processing unit 120 may be a general-purpose processor, a digital signal processor (DSP), or any equivalent circuitry, but the disclosure is not limited thereto.

In some embodiments, the image sensor 110 is capable of capturing two images simultaneously, where one of the captured images has a full resolution of the image sensor 110, and another captured image has a down-scaled resolution of the image sensor 110. The full-size image and the down-scaled image can both be temporarily stored in the memory unit 130 which can be regarded as a frame buffer.

In an embodiment, after the image sensor 110 captures an image (e.g. a full-size image), the processing unit 120 may analyze the image content of the captured image. For example, the processing unit 120 can recognize objects or targets in the captured image and determine whether the recognized object belongs to any of one or more predetermined categories. The predetermined categories of the recognized objects or targets may include faces, races, a scene (e.g. sky, grass, snow, sea, sunset, etc.), an article, text, one or more characters, a background, or a combination thereof but the disclosure is not limited there to. Then, the processing unit 120 can obtain different settings respectively for at least one of the recognized objects or targets belonging to one or more predetermined categories to generate a plurality of candidate images. In other words, the candidate images can be associated with a plurality of candidate setting values for at least one specific object or target in the captured images. The process of obtaining the different settings for the at last one recognized objects or targets in the predetermined categories can be performed by using a preference search strategy, as will be explained more in the following.

In an embodiment, for ease of selection by the user, the number of candidate images is 3, but the invention is not limited thereto.

The processing unit 120 may further provide the plurality of candidate images for selection by a user. To this end, the processing unit 120 may temporarily save the candidate images, e.g., in the memory unit 130, and display the candidate images or representatives thereof on a screen (not shown) of the photographic system 100. Accordingly, the processing unit 120 may determine an output image based on one of the candidate images selected by the user. In other words, the processing unit 120 can determine one of the candidate images that is most preferred by the user for sequential processes. In one embodiment, the processing unit 120 may store the output image in an album built by software or in the same physical folder and delete one or more non-selected image of the candidate images.

Consequently, the captured image can be tuned and stored in a way closer to the user preference. When none of the candidate images is selected by the user, the candidate image having a medium value of the candidate setting values may be selected to serve as or generate the output image, for example. In addition, the user may choose to delete the captured image if all of the candidate images are not satisfying to him. It is noted that the candidate images or representative thereof displayed for selection by the user may have resolutions different from (preferably smaller than) the resolution of the output image. In other words, either or both of the candidate images and their representatives may be displayed in a resolution different from the resolution of the output image, since they are provided to demonstrate the tuning effect of the different sets of candidate setting values on the captured image for selection by the user.

Several examples are provided below to explain different contents of the candidate images generated for captured images having different scenes. In a first example, assuming that the image content of the captured image is a scene having a large portion of grass, the processing unit 120 may recognize the portion of grass to be an object/target belonging to one of one or more predetermined categories and therefore provide a number of candidate images with different candidate setting values of the green color level for the whole picture or the large portion of grass. Accordingly, the candidate images having different green color levels can be provided and one of them can be selected by the user and an output image can be non-temporarily stored.

In a second example, assuming that the image content of the captured image is a scene having one or more human faces, the processing unit 120 may recognize all or at least one of the one or more human faces to be object(s)/target(s) belonging to one of one or more predetermined categories and therefore provide a number of candidate images with different candidate setting values of face color, which may be "darker", "medium", or "whiter" for all or at least one of the one or more human faces. Accordingly, the candidate images having different face colors can be provided such that one of them can be selected by the user and an output image can be non-temporarily stored.

In a third example, assuming that image content of the captured image is a scene having one or more women, the processing unit 120 may recognize all or at least one of the one or more women to be object(s)/target(s) belonging to one of one or more predetermined categories and therefore provide a number of candidate images with different candidate setting values of "wrinkle smoothing" for face(s) of all or at least one of the one or more women. Accordingly, the candidate images having different face wrinkle smoothing values can be provided such that one of them can be selected by the user and an output image can be non-temporarily stored.

In a fourth example, assuming that the image content of the captured image is a scene having characters, the processing unit 120 may recognize all or at least one of the characters to be object(s)/target(s) belonging to one of one or more predetermined categories and therefore provide a number of candidate images with different setting values of "edge strength" for all or at least one of the characters. Accordingly, the candidate images having characters in the most appropriate sharpness can be provided such that one of them can be selected by the user and an output image non-temporarily stored. It should be noted that the candidate setting values of each recognized object or target in the captured image may vary, and the invention is not limited to the aforementioned examples.

In some examples, if multiple objects/targets are recognized to belong to plural ones of the predetermined category, one or more of the recognized objects/targets can be determined to have different candidate setting values in the candidate images. However, although the sets of candidate setting values are provided for a specific object/target in the above examples, the disclosure is not limited thereto. In other examples, the sets of candidate setting values can be provided to a combination of plural objects/targets. For example, each set of candidate setting values can be associated with the colors of sky and faces.

Figure 2A:
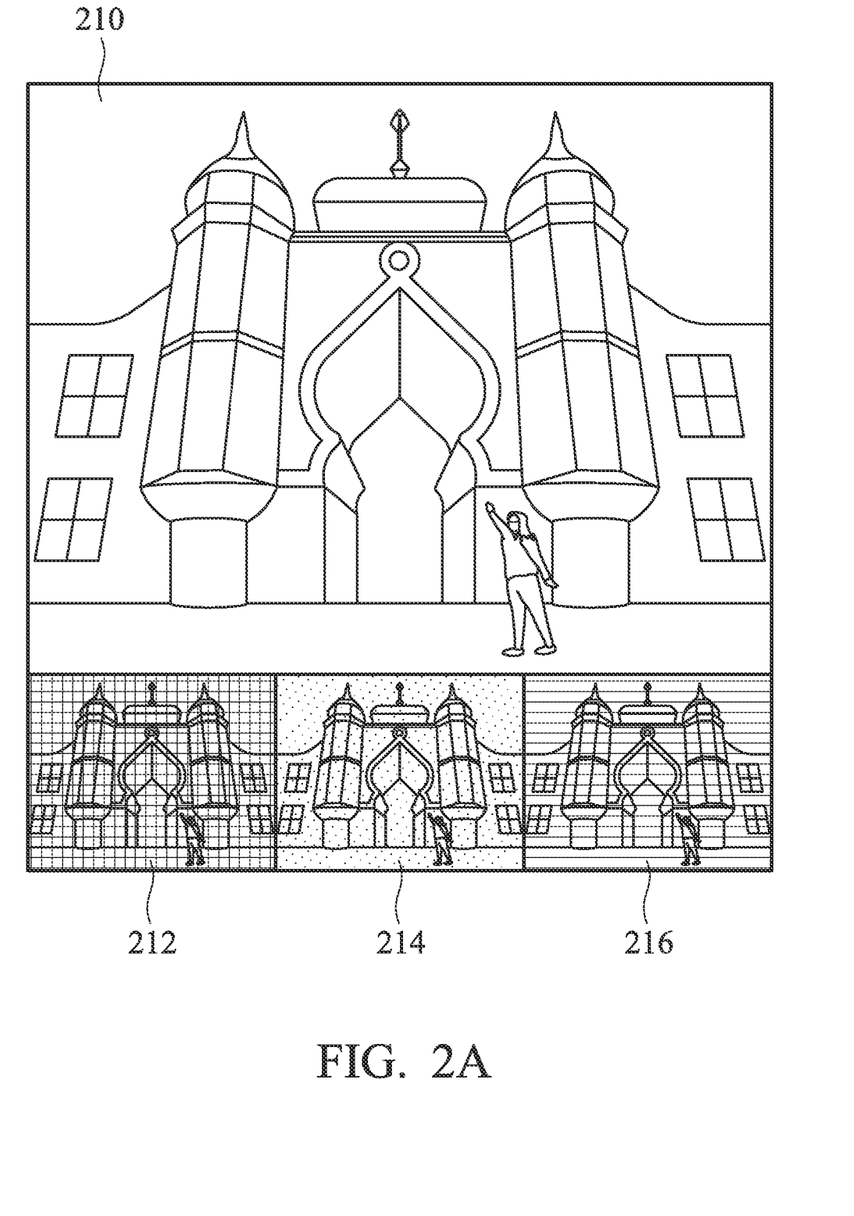
FIG. 2A is a diagram of the candidate images and the captured image in accordance with an embodiment of the invention.
Figure 2B:
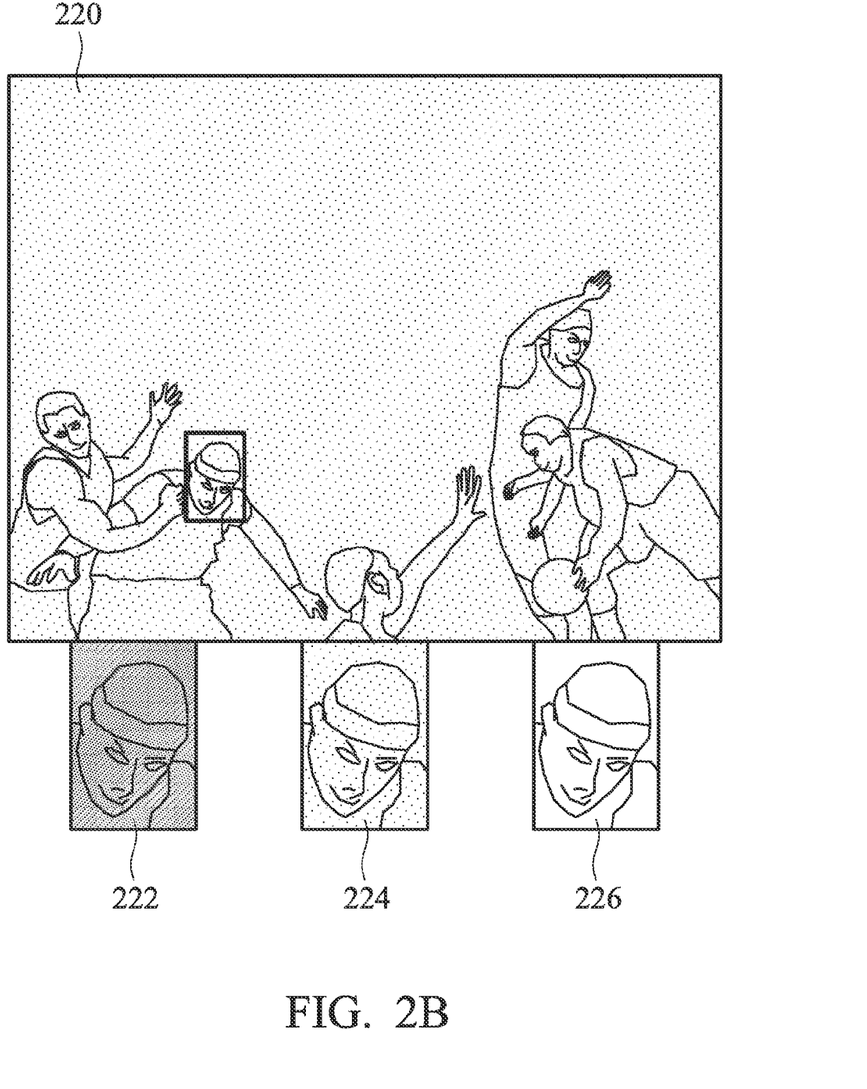
FIG. 2B is a diagram of the candidate images and the captured image in accordance with another embodiment of the invention.

FIG. 2A is a diagram of the candidate images and the captured image in accordance with an embodiment of the invention. FIG. 2B is a diagram of the candidate images and the captured image in accordance with another embodiment of the invention. Referring to FIG. 2A, in an embodiment, the candidate images 212, 214, and 216 may have different candidate setting values for a whole or global region of the captured image 210. Alternatively, the candidate images 222, 224, and 226 may have different candidate setting values for one or more partial or local regions of the captured image 220, e.g. a human face, and the region other than the determined region of the candidate images 222-226 remain unchanged and therefore the same to each other, as shown in FIG. 2B.

As described, after the processing unit 120 has determined the candidate images, the processing unit 120 may temporarily save the candidate images in the memory unit 130 and display the candidate images or representatives thereof on a screen of the photographic system 100. In some embodiments, a representative may be the whole candidate images or partial image of the candidate image, mainly demonstrating the recognized object/target tuned with a respective candidate setting value. Moreover, each candidate image or representative thereof may be displayed as a thumbnail on the screen of the photographic system 100. In one embodiment, the candidate images are displayed simultaneously in respective thumbnails on the screen to facilitate user's comparison and selection.

In addition, as mentioned, in some embodiments, the image sensor 110 is capable of capturing two images simultaneously, where one of the captured images has a full resolution of the image sensor 110, and another captured image has a down-scaled resolution of the image sensor 110. In such embodiments, each candidate image or a representative thereof can be generated from the captured image of the larger resolution or the other captured image having a smaller resolution. In one embodiment where the representatives of candidate images are displayed for selection by the user, each representative is preferably a detailed view of the recognized object/target on the screen of the photographic system 100. Therefore, the displayed representative is preferably an enlarged region of the recognized object/target generated from the captured image having the full resolution since more image details in the full-size captured image can be reserved and displayed in the representative shown in a thumbnail. In addition, as mentioned, an output image can be determined based on the selected candidate image.

It is noted that each of the candidate image, the representative of the candidate image, and an output image can be a full-resolution image or a down-scaled image according to different requirements. In an embodiment, the candidate image is a down-scaled image, the representative is a full image or a partial image of the candidate image and has a down-scaled resolution, and the output image is a full-resolution image. In an embodiment, the candidate image is a full-resolution image, the representative is a full image or a partial image of the candidate image and has a down-scaled resolution, and the output image is a full-resolution image. In further another embodiment, each of the candidate image, the representative of the candidate image, and the output image is a full-resolution image.

It should be noted that each time the user selects one of the candidate images, the processing unit 120 can add the user's decision and the analyzed image content into the training data of the preference search strategy, and determine the output image according to the selected candidate image. Then, the processing unit 120 can fine-tune the preference search strategy for providing candidate images for the specific category next time according to the training data.

In the following section, details for adjusting ad the preference search strategy will be described. The adjusting the preference search strategy is for converging the set of candidate setting values such that the candidate images can be increasingly closer to user's preference. In other words, user's preference can be learned by the preference search strategy. In an embodiment, an iterative search method is used that repeatedly adjust next set of candidate setting values according to user's selection this time. Specifically, the processing unit 120 fine-tunes the range of candidate setting values for the specific object or target according to the selected candidate setting value each time of selection. For example, an initial set of candidate setting values for a specific category can be set to be {0, 5, 10}. When the user selects the candidate image associated with the candidate setting value 10 from {0, 5, 10} for a specific category, the processing unit 120 may increase the values of the next set of candidate setting values to {8, 10, 12} for the specific category. Similarly, when the user selects the candidate image associated with the candidate setting value 8 from {8, 10, 12} for the specific category this time, the processing unit 120 may decrease the values of the next set of candidate setting values to {6, 8, 10} for the specific category. When the user selects the candidate image associated with the candidate setting value 8 from {6, 8, 10} in a next time for the specific category, the processing unit 120 may determine that the candidate setting value is converged and the user favors the candidate image associated with the candidate setting value 8 for the specific category.

In brief, the range of the candidate setting values can be widest in the initial set (i.e. from 0~10), but narrowed to be more concentrated to the selected candidate setting value each time based user's selection. The concentration or convergence process can make it increasingly easier for a user to determine his favorite candidate setting value from time to time.

It is noted that the user's selection may not be consistent or concentrative on a specific candidate setting value (e.g. weak preference) for a specific category, so the processing unit 120 may not converge the setting values for the specific category and cannot determine the user's preferences after several iterations. For example, the initial set of candidate setting values for a specific category is {0, 5, 10}. In a first selection where the user selects the candidate image associated with the candidate setting value 10, the processing unit 120 may increase the values of the next set of candidate setting values to {8, 10, 12} for the specific category. Next time (a second selection) when the user selects the candidate image associated with the candidate setting value 8 from {8, 10, 12} for the specific category, the processing unit 120 may decrease the values of the next set of candidate setting values to {6, 8, 10}. Next time (a third selection) the user selects the candidate image associated with the candidate setting value 6 from {6, 8, 10} for the specific category, the processing unit 120 may decrease the values of the next set of candidate setting values to {4, 6, 8}. Next time (a fourth selection) the user selects the candidate image associated with the candidate setting value 4 from {4, 6, 8} for the specific category, the processing unit 120 may decrease the values of the next set of candidate setting values to {2, 4, 6}.

However, there is conflict between the first selection and the fourth selection because the selected candidate setting value 4 of the fourth selection is out of the converge region of the first selection, i.e. from 5 to 10. Accordingly, the processing unit 120 may determine that the user's selection is an uncertain preference or a fake preference. In this condition, the processing unit 120 may determine that the candidate image with the default candidate setting value (e.g. 5) is selected. In other words, when the user's decision is detected as an uncertain preference or a fake preference, the user's decision may be ignored and may not used for adjusting the preference search strategy with respect to the predetermined category associated with the user's selection. In addition, the user may determine to restore the setting to the initial set of candidate setting values.

In some embodiments, since the number of provided candidate images may be limited, variations of candidate setting values of the candidate images may be limited to a single parameter, e.g. color temperature, edge strength, contrast, contrast, etc. In one embodiment, variations of candidate setting values of the candidate images are limited to two or more linearly correlated parameters. That is, the processing unit 120 fine-tunes the range of candidate setting values for the specific object or target further according to one or more addition parameters.

In an embodiment, when the processing unit 120 has learned the user's preferences for a plurality of predetermined categories, the processing unit 120 may extend the coverage of preference search strategy to be cover more predetermined categories or even beyond the predetermined categories. In other words, the adjustment of the preference search strategy can be conservative to focus on a specific predetermined category and gradually extended to cover different predetermined categories when an accumulated number of learning indicate the same user preference in diverse situations. For example, after a large number of learning indicating that the user prefers to have higher brightness for a specific predetermined category, the preference search strategy may provide candidate images having higher brightness for all captured images regardless whether the captured images contain objects/targets belonging to the specific categories or not. In another example, after a large number of learning indicating that the user prefers to have yellower skin for Americans, the preference search strategy may provide candidate images having yellow colors for American-white skins and European-white skins. In further another example, the processing unit 120 may determine that the user is in favor of a certain color temperature (e.g. a warm color having a low color temperature or a cool color having a high color temperature) or a certain edge strength based on learning from a sufficient number of user's preferences, and the processing unit 120 may provide candidate images that are closer to the color temperature or edge strength for every captured image.

Figure 3:
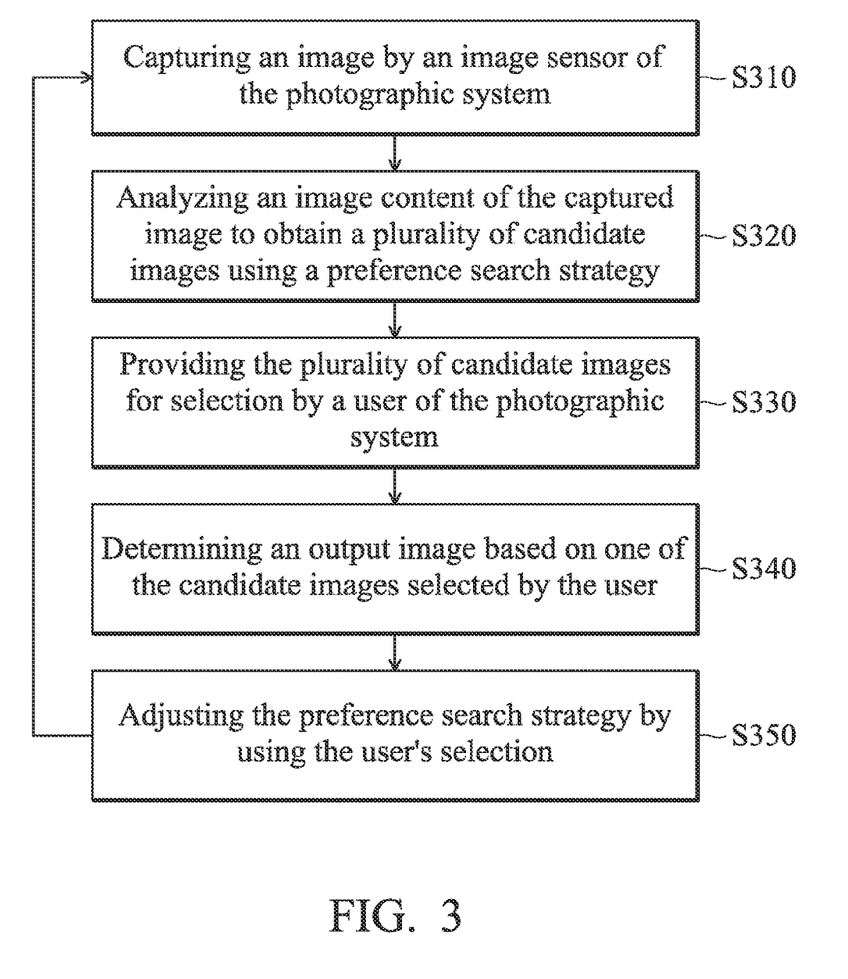
FIG. 3 is a flow chart of an image tuning method for use in the photographic system in accordance with an embodiment of the invention.

FIG. 3 is a flow chart of an image tuning method for use in a photographic system in accordance with an embodiment of the invention. The image tuning method may be applied to the photographic system 100 of FIG. 1 but not limited thereto. For purpose of explanation only, the image tuning method is described by using the photographic system 100 of FIG. 1. In step S310, the image sensor 110 of the photographic system 100 captures an image. In step S320, the processing unit 120 analyzes the image content of the captured image to obtain a plurality of candidate images using a preference search strategy. In step S330, the processing unit 120 provides the plurality of candidate images for selection by a user of the photographic system. The processing unit 120 may display the candidate images or representatives thereof on the screen of the photographic system 100. The representatives may be a whole or global region of the captured image, or a partial or local region of the captured image.

In step S340, the processing unit 120 can determine an output image based on one of the candidate images selected by the user. The processing unit 120 can further save the output image into an album of the photographic system 100. In step S350, the processing unit 120 can adjust the preference search strategy by using the user's selection. Specifically, the processing unit 120 can add the user's selection and the analyzed image content to the training data of the preference search strategy after the user has selected one of the candidate images. If an uncertain preference or a fake preference is detected, the user's selection may be ignored. If the user does not select any candidate image, the candidate image having the medium candidate setting value may be selected to determine the output image. Details of each step may be analogized from the other embodiments, thus omitted here for brevity.

In view of the above, a photographic system and an associated image tuning method are provided. The photographic system and the image tuning method are capable of fine-tuning the preference search strategy for a specific object or target in the captured image according to the user's selection of candidate images, so that the photographic system may learn the user's preference and provide candidate images that are increasingly closer to the user's preference after each iteration.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuity in accordance with the functions and operations described herein. The specific structure or interconnections of the transistors may be determined by a compiler, such as a register transfer language (RTL) compiler. RTL compilers operate upon scripts that closely resemble assembly language code, to compile the script into a form that is used for the layout or fabrication of the ultimate circuitry. RTL is well known for its role and use in the facilitation of the design process of electronic and digital systems.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image tuning method for use in a photographic system, comprising:
   capturing an image by an image sensor of the photographic system;
   analyzing an image content of the captured image to obtain a plurality of candidate images using a preference search strategy;
   providing the plurality of candidate images for selection by a user of the photographic system;
   determining an output image based on one of the candidate images selected by the user;
   adjusting the preference search strategy by using the user's selection; and
   when the user's selection is detected as an uncertain preference or a fake preference, ignoring the user's selection for adjusting the preference search strategy with respect to the predetermined category associated with the user's selection.

2. The image tuning method as claimed in claim 1, wherein the output image is stored in an album and the at least one non-selected candidate image is deleted after the determination.

3. The image tuning method as claimed in claim 1, wherein the providing the plurality of candidate images for selection by a user of the photographic system comprises:
   temporarily saving the candidate images; and
   displaying the candidate images or representatives thereof on a screen of the photographic system.

4. The image tuning method as claimed in claim 1, wherein the analyzing image content of the captured image to obtain a plurality of candidate images using the preference search strategy comprises:
   recognizing one or more objects or targets in the captured image;

determining whether the recognized objects or targets belong to one or more predetermined categories;

obtaining different setting values respectively for at least one of the one or more recognized objects or targets belonging to the one or more predetermined categories to generate the plurality of candidate images.

5. The image tuning method as claimed in claim 4, wherein the candidate images have different candidate setting values for one or more partial or local regions of the captured image.

6. The image tuning method as claimed in claim 4, wherein the candidate images have different candidate setting values for a whole or global region of the captured image.

7. The image tuning method as claimed in claim 4, wherein the adjusting the preference search strategy by using the user's selection comprises: fine-tuning a range of candidate setting values for the specific object or target according to the candidate setting value of the candidate image selected by the user.

8. The image tuning method as claimed in claim 7, wherein the adjusting the preference search strategy by using the user's selection comprises: fine-tuning the range of candidate setting values for the specific object or target further according to one or more additional parameters.

9. The image tuning method as claimed in claim 7, wherein the fine-tuning the range of candidate setting values for the specific object or target according to the candidate setting value of the selected candidate image comprises:
narrowing the range of candidate setting values for the specific object or target to be more concentrated to the candidate setting value of the candidate image selected by the user.

10. The image tuning method as claimed in claim 1, wherein the recognized one or more objects/targets comprises at least one of one or more faces, races, a scene, an article, text, one or more characters, a background, and a combination thereof.

11. The image tuning method as claimed in claim 10, wherein providing the plurality of candidate images for selection by a user of the photographic system comprises:
when text or characters are detected in the captured image, providing the candidate images with different edge strengths for the text or the characters.

12. The image tuning method as claimed in claim 1, wherein the plurality of candidate images are associated with a plurality of candidate setting values for at least one specific object/target in the captured image, respectively.

13. The image tuning method as claimed in claim 12, further comprising:
selecting the candidate image having a medium value of the candidate settings to determine the output image when none of the candidate images is selected by the user.

14. A photographic system, comprising:
an image sensor, for capturing an image; and
a processing unit, configured to analyze image content of the captured image to obtain a plurality of candidate images using a preference search strategy, provide the plurality of candidate images for selection by a user of the photographic system, determine an output image based on one of the candidate images selected by the user, and adjust the preference search strategy by using the user's selection, wherein when the user's selection is detected as an uncertain preference or a fake preference, the processing unit ignores the user's selection for adjusting the preference search strategy with respect to the predetermined category associated with the user's selection.

15. The photographic system as claimed in claim 14, wherein the output image is stored in an album and the at least one non-selected image is deleted after the determination.

16. The photographic system as claimed in claim 14, wherein the processing unit further temporarily saves the candidate images in a memory unit of the photographic system, and displays the candidate images or representatives thereof on a screen of the photographic system.

17. The photographic system as claimed in claim 14, wherein the processing unit further recognizes one or more objects or targets in the captured image, determines whether the recognized objects or targets belong to one or more predetermined categories, and obtains different setting values respectively for at least one of the one or more recognized objects or targets belonging to the one or more predetermined categories to generate the plurality of candidate images.

18. The photographic system as claimed in claim 17, wherein the candidate images have different candidate setting values for one or more partial or local regions of the captured image.

19. The photographic system as claimed in claim 17, wherein the candidate images have different candidate setting values for a whole or global region of the captured image.

20. The photographic system as claimed in claim 17, wherein the processing unit fine-tunes a range of candidate setting values for the specific object or target according to the candidate setting value of the candidate image selected by the user.

21. The photographic system as claimed in claim 20, wherein the processing unit fine-tunes the range of candidate setting values for the specific object or target further according to one or more additional parameters.

22. The photographic system as claimed in claim 20, wherein the processing unit further narrows the range of candidate setting values for the specific object or target to be more concentrated to the candidate setting value of the candidate image selected by the user.

23. The photographic system as claimed in claim 14, wherein the recognized one or more objects/targets comprises at least one of one or more faces, races, a scene, an article, text, one or more characters, a background, and a combination thereof.

24. The photographic system as claimed in claim 14, wherein the plurality of candidate images are associated with a plurality of candidate setting values for at least one specific object/target in the captured image, respectively.

25. The photographic system as claimed in claim 24, wherein the processing unit further selects the candidate image having a medium value of the candidate settings to determine the output image when none of the candidate images is selected by the user.

26. The photographic system as claimed in claim 24, wherein when text or characters are detected in the captured image, the processing unit further provides the candidate images with different edge strengths for the text or the characters.

* * * * *